(12) United States Patent
Fredriksson

(10) Patent No.: US 7,391,574 B2
(45) Date of Patent: Jun. 24, 2008

(54) HEAD-UP DISPLAY

(75) Inventor: Arnold Fredriksson, Huskvarna (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 11/639,332

(22) Filed: Dec. 15, 2006

(65) Prior Publication Data

US 2007/0217018 A1    Sep. 20, 2007

(30) Foreign Application Priority Data

Dec. 15, 2005  (EP)  ................. 05112249

(51) Int. Cl.
G02B 27/14 (2006.01)
G09G 5/00 (2006.01)

(52) U.S. Cl. .......................... 359/630; 345/7

(58) Field of Classification Search ......... 359/629–633; 345/7–9

See application file for complete search history.

(56) References Cited

U.S. PATENT DOCUMENTS

| 4,697,879 A | 10/1987 | Gerbe |
| 4,723,160 A * | 2/1988 | Connelly .................. 359/631 |
| 4,874,214 A | 10/1989 | Cheysson et al. |
| 4,997,263 A | 3/1991 | Cohen |
| 5,483,307 A | 1/1996 | Anderson |
| 5,596,451 A | 1/1997 | Handschy et al. |
| 5,943,171 A | 8/1999 | Budd et al. |
| 5,993,000 A * | 11/1999 | Kobayashi et al. ......... 351/211 |

FOREIGN PATENT DOCUMENTS

| EP | 0 288 365 | 10/1988 |
| EP | 0 330 184 | 8/1989 |
| WO | WO 95/10106 | 4/1995 |
| WO | WO 01/02912 | * 1/2001 |

OTHER PUBLICATIONS

European Search Report issued in counterpart European patent application 05112249.7.

* cited by examiner

*Primary Examiner*—Alicia M Harrington
(74) *Attorney, Agent, or Firm*—Venable LLP; Eric J. Franklin

(57) ABSTRACT

A head-up display system including an image source with a projection lens where the lens projects an intermediate image on a diffuser, forming an intermediate image on the diffuser matt surface. A first planar semi-transparent mirror is arranged to reflect the intermediate image towards a head-up semi-transparent collimating mirror. The collimating mirror also combines the image with the background.

14 Claims, 2 Drawing Sheets

HEAD-UP DISPLAY

CROSS-REFERENCE TO RELATED APPLICATIONS

This application claims priority to European patent application 05112249.7 filed 15 Dec. 2005.

FIELD OF INVENTION

The present invention relates to optical presentation devices and sights. In particular it relates to a head-up display.

BACKGROUND

Head-up displays and sights available on the market today present a large size and an expensive price tag. This makes them unsuitable for small aeroplanes and helicopters. The sights are normally also provided with some angular magnification and a corresponding smaller field of view, which limits their use to aiming of weapons.

U.S. Pat. No. 4,697,879 disclose an airborne display system for viewing high-definition collimated images. The system includes a high-key image generator, a head-down collimating assembly, an optical relay device, and an optical mixing device. The system is devised to display images from two image sources.

U.S. Pat. No. 5,943,171 disclose a head mounted display for entering an image into the eye of a viewer along a viewing axis. The display includes polarizers and a concave mirror.

U.S. Pat. No. 5,596,451 disclose an assembly for producing a visual display including a light-reflecting type spatial light modulator and illumination arrangement for providing a particular source of light.

WO 95/10106 disclose a binocular head mounted display unit.

There is a need for low-price, non-bulky head-up displays suitable for use in small vehicles such as small aeroplanes and helicopters.

One object of the present invention is therefore to provide a head-up display system that is compact in size. It is also a further objective of the present invention to provide a head-up display system that comes with a low cost.

The image that is to be shown to the pilot may comprise symbols and aiming marks, generated by an accompanying computer and electronics. Further objectives include that the direction accuracy and stability of these symbols and marks must be good enough for views for sighting. An image from a thermal imaging device should also be possible to superimpose on the pilot's view of the terrain and/or the runway issuing the angular magnification of 1, to make it possible to achieve a safe landing even during bad weather and sight conditions. Another object of the present invention is therefore to provide equipment with an image resolution corresponding to SXGA or better (1400×1050).

The image that is to be shown for the pilot have to be collimated, (appear to be at a large distance), which implies that the pilot can move his head without affecting the direction (free of parallax), and there is no need for accommodation of the pilots eyes as he shift his view from the terrain to the symbols/thermal image.

SUMMARY

A head-up display system comprising an image source with a projection lens where said lens projects an image on a diffuser, forming an intermediate image on said diffuser, said system further comprising a first planar semi-transparent mirror, arranged to reflect said intermediate image towards a head-up semi-transparent collimating mirror.

The system may further comprise a folding mirror arranged optically between the projection lens and the diffuser. The image source can be of a transmitting (LCD) or reflecting (DMD) type.

The main radius of curvature of the collimating mirror is such that its centre of curvature becomes close to a midpoint between the pilot's eyes. Using a radius of curvature of the diffuser surface of half of the radius of curvature of the collimating mirror yields good focusing over the whole field of view. The diffuser surface comprises a grounded or sand blasted surface or a surface having a diffraction pattern or a holographic layer.

The head-up display system may further comprise an alignment device for aligning the image seen by the pilot with a reference. The alignment device comprises a sensor system that determines the direction of a normal to a mirror, mounted on the fuselage of the aircraft or a thermal camera, thus constituting the reference.

The head-up display system may further comprise a brightness control arrangement, where an environmental luminance is measured and the brightness of the image source is adjusted accordingly.

BRIEF DESCRIPTION OF THE DRAWINGS

Other features of the invention will be more apparent upon consideration of the following description and of the accompanying drawings, wherein.

DESCRIPTION OF PREFERRED EMBODIMENTS

The present invention relates to a combination of a head-up display for flight and landing guidance and weapons sight, which can be used in small aircraft and helicopters. This implies a relatively small piece of equipment which should be capable of covering a limited part of the total field of view of the pilot. Despite relatively small outer dimensions, it should be able to display a field of view with a diagonal larger than 25 degrees.

A projector part of a head-up display system according to an embodiment of the present invention is devised to use technology used in consumer products such as digital projectors to relatively low cost. The total cost therefore will be acceptable also for installation in e.g. small aeroplanes and helicopters.

The above objectives are satisfied according to the present invention by a system as described below.

Projector Part

Figure 1:
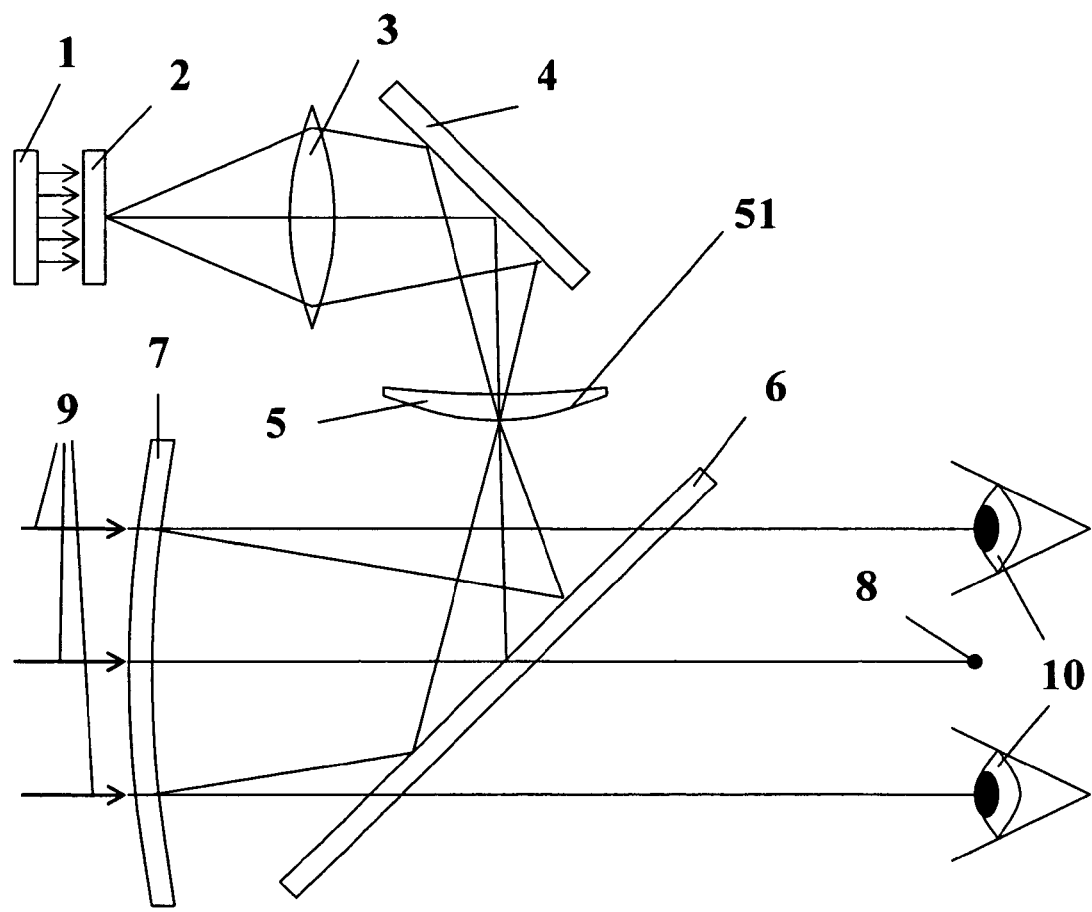
FIG. 1 shows an optical system layout of a display system in accordance with the invention.

FIG. 1 shows an optical system layout of a display system in accordance with a preferred embodiment of the invention. A projector part comprises an image generator display 2 and a light source 1 preferably chosen among standard components, e.g. such standard components that normally form part of digital projectors. The light source 1 can be a lamp or light emitting diodes. The image generator display 2 may be of a transmitting type (LCD, Liquid Crystal Display) as shown in FIG. 1, or may be of a reflecting type (DMD, Digital Micromirror Device) with corresponding change of the light source 1 position.

The projector part further comprises a projection lens 3 devised to provide a curved image plane with a radius of curvature close to that of a diffuser 5. The projection lens 3 is preferably designed to have small distortion. In another embodiment, where the projection lens 3 has too much distortion, control electronics for the display generates an image with a reversed distortion compared to the projection objective lens 3, thus eliminating the distortion of the lens.

An intermediate image is focused on the farther surface of a diffuser lens 5, where a matt surface 51 is provided. The matt surface 51 may comprise a ground or sand blasted surface or a surface having a diffraction pattern or a holographic layer.

The folding mirror 4 has the purpose of reducing the outer dimensions of the projection part, and provide said projection part with a shape such that it is obstructing as little as possible of the pilot's view. To further reduce dimensions, and tailor the shape of the projection part, one or more mirror(s) may be added.

Head-up Part

Conventional head-up displays either use a flat mirror or an off-axis spherical (or aspherical or holographic) mirror as a combiner to combine an image with the background.

In order to achieve high image quality and small outer dimensions, a combiner according to an embodiment of this invention comprises a spherical, or slightly aspherical, semi-transparent mirror 7 arranged relatively to a diffuser 5 such that a centre of an intermediate display image on said diffuser 5 comes on the optical axis (on-axis configuration) of the mirror 7. The optical axis is folded between the intermediate display image on the diffuser matt surface 51 and the collimating mirror 7 by a semi-transparent folding flat mirror 6. The collimated rays from the collimating mirror 7 and rays from the background 9 are transmitted through this semi-transparent mirror 6 to the eyes 10. This means that some of the volume is passed twice or even three times by rays on their way from the display image to the eyes. This is a key feature to small outer dimensions.

Together with the folding flat mirror 6, main components of a basic embodiment of the head-up display are a semi-transparent collimating mirror 7 and an image projected on the diffuser matt surface 51, arranged in the focal plane of the collimating mirror 7. The diffuser lens 5 is arranged such that an image appears on one of its surfaces, preferably the surface closest to the flat mirror 6. That image is an intermediate image of the display surface 2. It is projected on the diffuser matt surface 51, the purpose of which is to spread the light from the image towards a sufficient large area of the collimating mirror 7 to allow for the pilot to move his head and still get collimated images of acceptable luminosity to both eyes 10. This is equal to say that the exit aperture is widened.

The collimating mirror 7 is in the preferred embodiment spherical but could be slightly aspherical to improve the image quality further. By placing the collimating mirror 7 and choosing its radius of curvature such that its centre of curvature becomes close to the midpoint between the pilot's eyes 8, which is the centre of the exit aperture of the system, the quality of the collimated image will be high within a rather large eye position envelope and within a rather large field of view. For example, it is possible to achieve the image resolution and field of view needed with a radius of curvature of approximately 500 mm and with the pilot's eyes within an area of at least 60×120 mm.

To achieve the high quality collimated image, the diffuser matt surface 5 is arranged to be curved and the radius of curvature to be approximately half the (main) radius of curvature of the collimating mirror 7. The diffuser matt surface 51 may comprise a ground or sand blasted surface or a surface having a diffraction pattern or a holographic layer. The diffuser lens 5 is directing the light from the centre of the projection lens 3 towards the exit aperture centre 8, thereby acting as a field lens making the whole collimated image equally illuminated.

The semi-transparent collimating mirror 7 and the semi-transparent flat mirror 6 can be designed to reflect the main part of one (or a few) colour(s) while transmitting the main part of all other colours. That means that e.g. landing guidance symbols and aiming marks generated by the image generator 1,2 may have different colours representing different types of information. It is also possible to choose colours increasing the contrast to the background making them easier to recognise.

A further embodiment comprises a luminance control unit (not shown). The luminance of the background 9 is measured by a background luminance sensor (not shown) and the luminance of the intermediate image on the diffuser matt surface 51 is adjusted accordingly by adjusting the brightness of the image generating display 2 and/or the light source 1. Also the diameter of an aperture stop in the projection lens 3 may be varied and/or a variable attenuation filter may be used. In a preferred embodiment the light source 1 is one or several light emitting diodes (LED), and the average brightness of the light source 1 is controlled by the luminance control unit by pulsing the current, i.e. by applying different rations between on- and off periods. Using the above arrangement, the image on the diffuser surface 51 becomes automatically adjusted in brightness such that it becomes clearly visible relative to the background, including bright sky or sunny snow. The brightness is also adjusted such that the pilot does not become blind or dazzled or otherwise influenced such that he becomes impaired in vision regarding e.g. his ability to perceive details on a runway during bad light conditions.

Direction Reference

Figure 2:
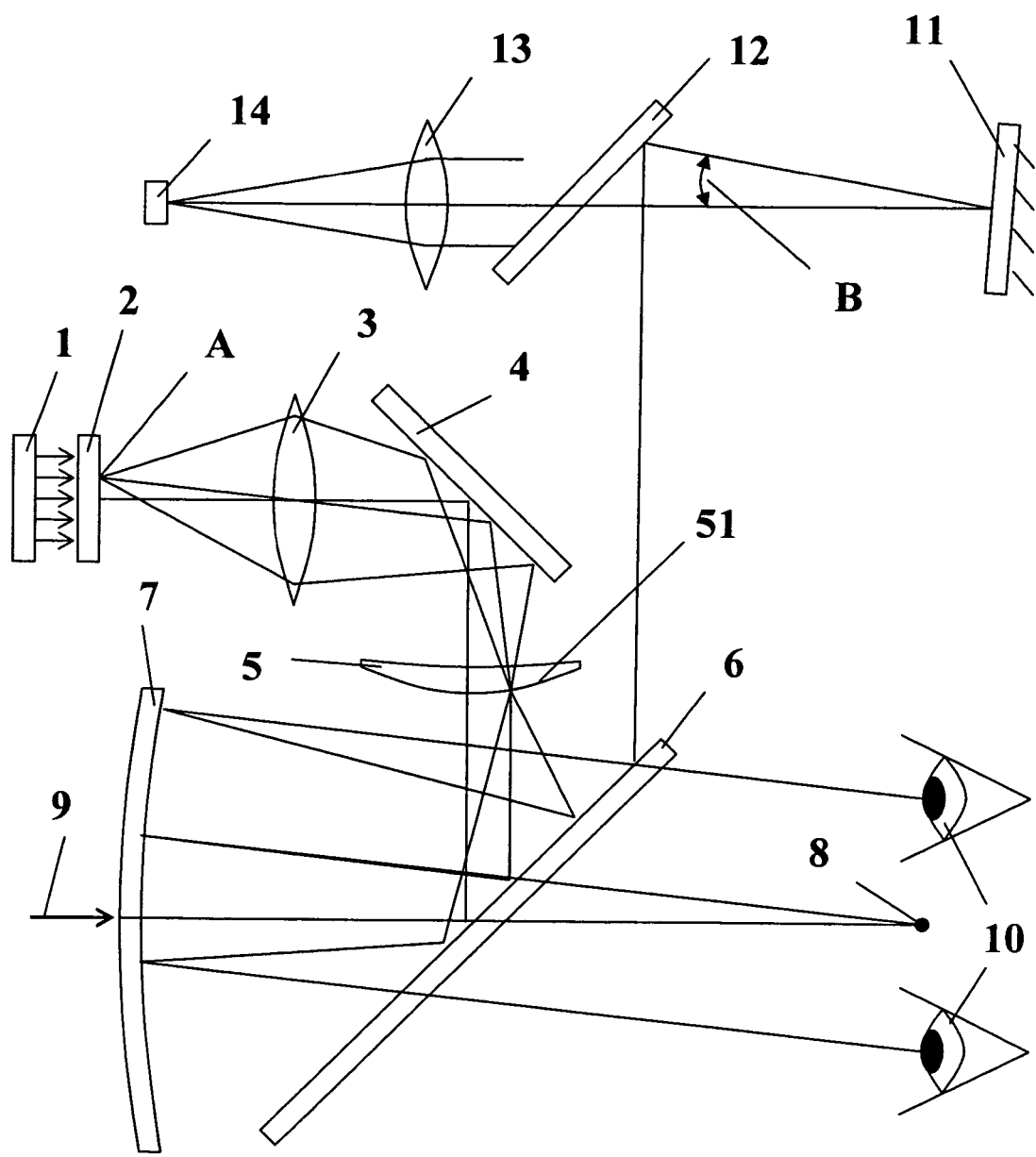
FIG. 2 shows the optical system of FIG. 1 with an additional system for aligning a projected image with an aircraft fuselage.

As the symbols that is to be shown to the pilot may be used as aiming marks or angular landing guidance, the angular relation to a weapon or a thermal camera must be accurate enough. This is not always possible to achieve within the required envelope of temperature and mechanical stress. FIG. 2 shows how it is possible to use a reference mirror 11 which has been fixed to the fuselage of the aircraft to make the image that the pilot sees through the head-up part aligned in relation to the fuselage of the aeroplane/helicopter and therewith also in relation to a weapon system or to e.g. a thermal imaging device.

The device is mainly what in optical measurement technology is named an auto-collimator, the main part of which is the collimator, the telescope, the beamsplitter and the mirror fixed to the measurement subject. The measurement subject is the fuselage of the aircraft/helicopter and a reference mirror 11 is fixed to it. The beamsplitter part is the semi-transparent plane mirror 12 which is arranged to be parallel with or is arranged to form a known angle in relation to the plane semi-transparent plane mirror 6. The collimator part is the head-up display, which directs a collimated beam from e.g. a point A on the display 2 via the intermediate image on the matt surface 51 of the diffuser 5 towards the semi-transparent flat mirror 6, which reflects it towards the beamsplitter 12.

The telescope part is the lens 13 and detector 14 which have a field of view that corresponds to only one or a small number of picture elements (pixels).

The alignment device further comprises an encoding unit (not shown) for encoding the position of each pixel. By encoding each pixel with its position within a small peripheral part of the image, it will be possible for the detector 14 and its electronics to determine the position A in the display image 2 that corresponds to the direction of the normal to the reference mirror 11, which is the bisector of the angle B. The encoding principle can be the time when a pixel is illuminated relative to a time reference. As a small peripheral part of the image is used, the semi-transparent mirror 6 can be made non-transparent within a corresponding small part, not to confuse the pilot by the encoding pattern.

By this device it is possible to determine one point in the image determined by the direction of the normal to the reference mirror. In still a further embodiment rotational imperfections can be handled by means of a second reference mirror fixed to another part of the fuselage to further increase the accuracy. In such an embodiment another set of optical elements corresponding to the beamsplitter 12, lens 13 and detector 14 is arranged to determine the direction of the normal to this second reference mirror.

In a preferred embodiment it is provided that control electronics move or adjust the picture that the pilot sees, such that it becomes precisely aligned to the aircraft fuselage and thereby also in reference to a weapon system or e.g. a thermal imaging device accurately mounted on said fuselage.

The invention claimed is:

1. A vehicle mounted head-up display system, comprising:
    an image source;
    a projection lens arranged to receive an image from the image source;
    a diffuser comprising a matt surface, wherein said projection lens is arranged relative to the diffuser to project an intermediate image on the diffuser matt surface;
    a planar semi-transparent mirror arranged to receive the intermediate image from the diffuser; and
    a head-up collimating mirror arranged to receive said intermediate image from the planar semi-transparent mirror and reflect the intermediate image to a user, wherein a background image is transmitted through the head-up collimating mirror to the user.

2. The head-up display system according to claim 1, further comprising:
    a folding mirror arranged optically between the projection lens and the diffuser.

3. The head-up display system according to claim 1, wherein said image source is a transmitting image source.

4. The head-up display system according to claim 1, wherein said image source is a reflecting image source.

5. The head-up display system according to claim 1, wherein the head-up collimating mirror has a radius of curvature having a center of curvature in the vicinity of a midpoint between eyes of a pilot viewing the display.

6. The head-up display system according to claim 1, wherein the diffuser matt surface has a radius of curvature that is approximately one-half of a radius of curvature of the collimating mirror.

7. The head-up display system according to claim 1, wherein the diffuser comprises a ground or sand blasted surface.

8. The head-up display system according to claim 1, wherein the diffuser matt surface comprises a surface with a diffraction pattern or a holographic layer.

9. The head-up display system according to claim 1, wherein the collimating mirror and the semi-transparent flat mirror reflect a main part of one or a few colors while transmitting a main part of all other colors, and wherein the image generator generates guidance symbols, aiming marks and/or a thermal image having said color(s).

10. The head-up display system according to claim 1, wherein said image source comprises an image generating display and a light source comprising one or more light emitting diodes.

11. The head-up display system according to claim 10, further comprising:
    a luminance control unit for adjusting an average brightness of the light source relative to a background brightness, such that image symbols become clearly visible.

12. A head-up display system, comprising:
    an image source;
    a projection lens arranged to receive an image from the image source;
    a diffuser comprising a matt surface, wherein said projection lens is arranged relative to the diffuser to project an intermediate image on the diffuser matt surface;
    a planar semi-transparent mirror arranged to receive the intermediate image from the diffuser;
    a head-up collimating mirror arranged to receive said intermediate image from the planar semi-transparent mirror; and
    an alignment device for aligning an image seen by a pilot with a fuselage of a aircraft.

13. The head-up display system of claim 12, further comprising:
    a flat mirror;
    a detector focusing lens; and
    a detector,
    wherein said alignment device comprises a second semi-transparent mirror being arranged parallel, or with a known angle relative to the first semi-transparent mirror, wherein said second semi-transparent mirror is arranged to reflect light corresponding to a small part of an image towards the flat mirror, letting reflected light pass through the second semi-transparent mirror towards the detector focusing lens that focus a small part of the image on the detector.

14. The head-up display system according to claim 13, wherein said alignment device comprises an encoding unit for encoding the position of each pixel, and wherein the detector comprises electronics comprising means for determining a position in a display image that corresponds to a direction for a normal to the reference mirror, the system further comprising:
    control electronics configured to move or adjust the image seen by the pilot, such that the image seen by the pilot becomes precisely aligned to the fuselage of the aircraft.

* * * * *